Feb. 5, 1952 — C. E. TACK — 2,584,940
DUPLEX BRAKE
Filed May 14, 1949 — 3 Sheets-Sheet 1

INVENTOR.
Carl E. Tack
BY
Atty.

Feb. 5, 1952     C. E. TACK     2,584,940
DUPLEX BRAKE

Filed May 14, 1949     3 Sheets-Sheet 2

INVENTOR.
Carl E. Tack
BY

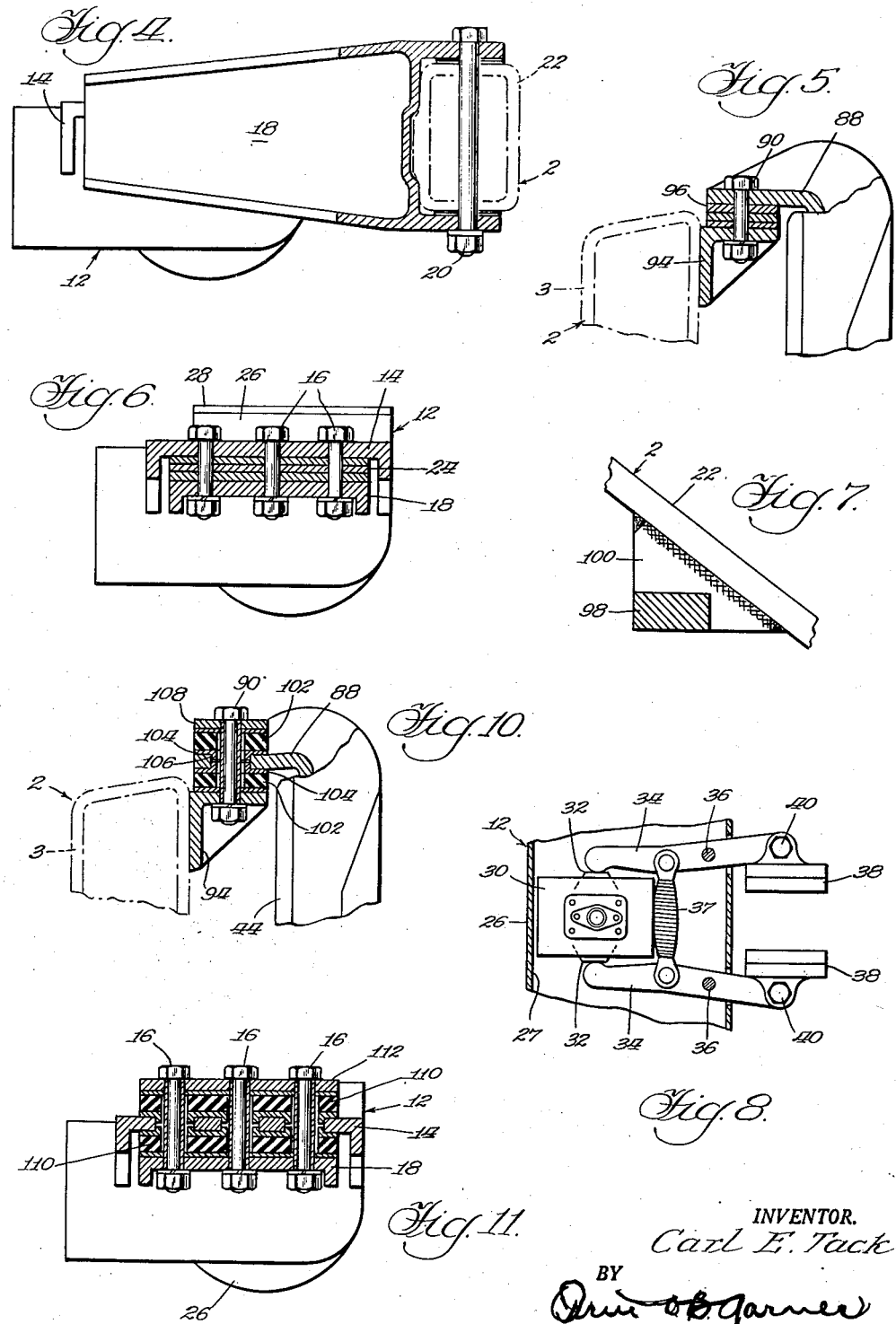

Patented Feb. 5, 1952

2,584,940

UNITED STATES PATENT OFFICE 2,584,940

DUPLEX BRAKE

Carl E. Tack, Chicago, Ill., assignor to American Steel Foundries, Chicago, Ill., a corporation of New Jersey Application May 14, 1949, Serial No. 93,356

14 Claims. (Cl. 188—59)

1

This invention relates to railway brakes and more particularly to a novel support for brakes having wheel brake means and off-wheel brake means.

A primary object of the invention is to devise a package unit which may be quickly and conveniently mounted on a standard truck frame and which may contain wheel brake means and off-wheel brake means of rugged design capable of withstanding the severe stresses of railway service.

A further object of the invention is to devise a novel mounting for a package unit such as above described accommodating convenient assembly and disassembly of the device without disturbing the truck parts.

A different object of the invention is to devise a special support adapted to transmit braking torque from the off-wheel brake means to the truck frame and adapted to transmit brake reaction or thrust from the wheel brake means to the truck frame without the use of excessively heavy and cumbersome connections thereto.

Another object of the invention is to arrange the wheel brake means so that its thrust or brake reaction is effective to counteract the braking torque of the off-wheel brake means under certain conditions, thereby minimizing the effect of such forces on the truck frame.

Still another object of the invention is to devise thrust transmitting means on the unit and truck frame in longitudinal alignment with the wheel brake means to minimize torque stresses on the connections between the truck frame and brake unit.

The foregoing and other objects and advantages of the invention will become apparent from the following specification and the accompanying drawings, wherein:

Figure 4 is a sectional view on the longitudinal vertical center plane of the truck as indicated by the line 4—4 of Figure 1;

Figure 5 is a sectional view in the vertical planes indicated by the line 5—5 of Figure 1;

Figure 6 is a sectional view on the line 6—6 of Figure 1;

Figure 7 is a sectional view on the line 7—7 of Figure 2;

Figure 8 is a fragmentary broken top plan view of the central portion of the brake support unit;

Figures 10 and 11 are sectional views corresponding to Figures 5 and 6 respectively, but showing a modified resilient mounting for the unit.

2

Figure 1:
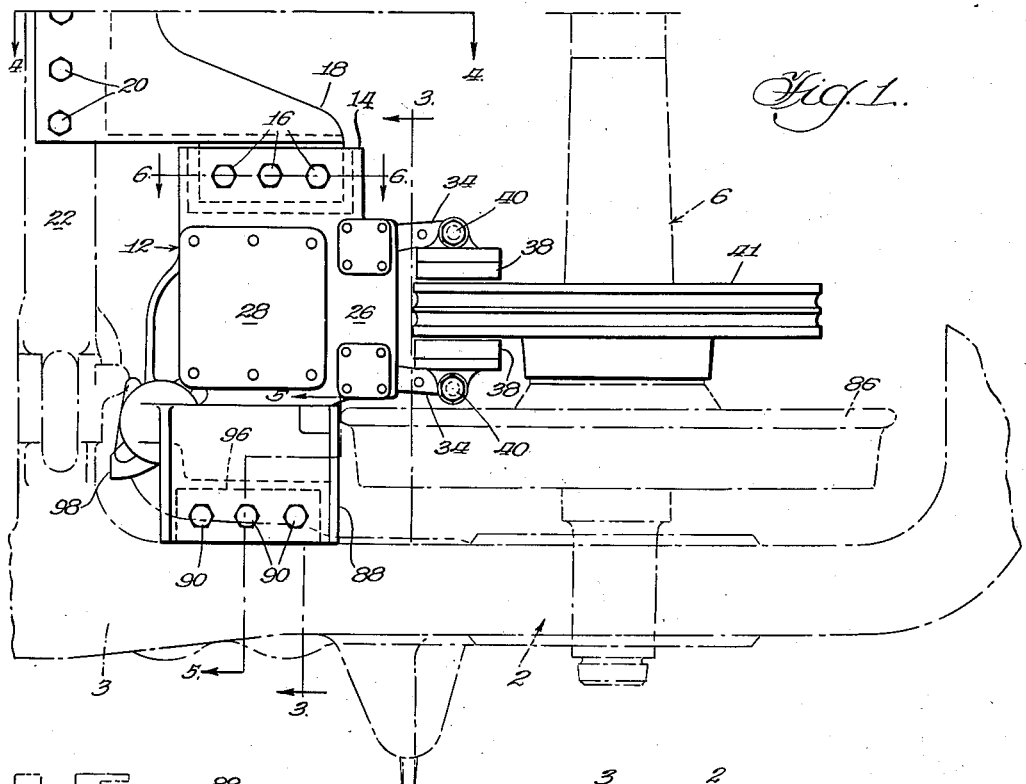
Figure 1 is a fragmentary top plan view of a conventional railway car truck and brake embodying the invention.

In each of said figures, certain details may be omitted for the sake of clarity, where more clearly shown in other views.

Describing the invention in detail, the novel brake support structure is shown as applied to a conventional railway car truck frame 2 having a side rail 3 and having spaced pedestals 4 (Figure 2) adjacent each end thereof to accommodate a journal box (not shown) of a wheel and axle assembly 6. The frame 2 is spring supported at 8 (Figure 3) by an equalizer 10, the ends of which are supported in conventional manner by the journal boxes (not shown) of the wheel and axle assemblies, only one of which is illustrated, at one end thereof, inasmuch as the novel brake support structure may be applied to each corner of the truck frame 2 for cooperation with one wheel and an associated brake disc, as hereinafter discussed in detail.

The novel brake support structure comprises a housing or brake support 12, preferably formed as a single casting, although this member may be fabricated in any desired manner. At one end thereof the housing 12 is formed with a torque lug 14 connected as by bolts 16 to a torque arm 18, which is connected as by bolts 20, to a transom 22 of the truck frame 2, extending transversely thereof. Spacers 24 are preferably disposed between the lug 14 and arm 18.

The housing 12 contains a central portion 26, having a chamber 27 closed by a top cover plate 28 (Figure 1), secured thereto as by studs, said chamber containing a cylinder 30 and pistons 32 operatively associated with levers 34 pivoted at 36 (Figure 8) to the housing. A release spring 37 is connected between the levers. The outer ends of the levers 34 carry brake shoes 38 pivoted thereto as at 40 and adapted to engage an interposed brake disc 41 secured in any convenient manner for rotation with the wheel and axle assembly 6.

Figure 3:
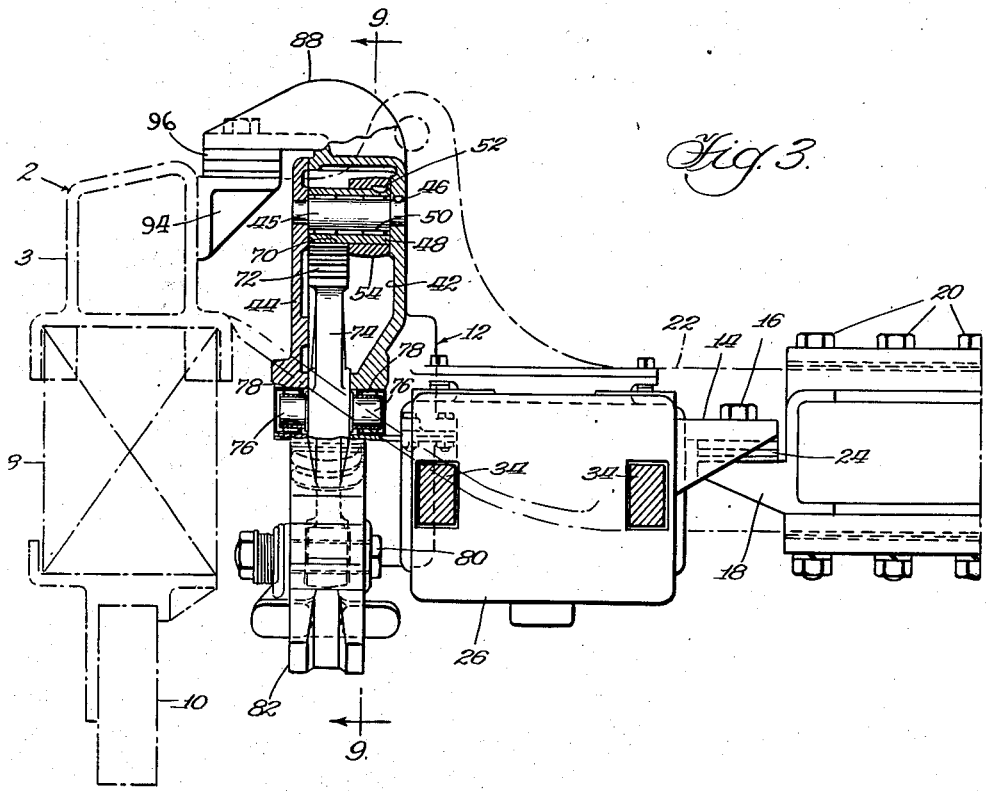
Figure 3 is a sectional view on the vertical planes indicated by the line 3—3 of Figure 1, portions of the structure being broken away.
Figure 9:
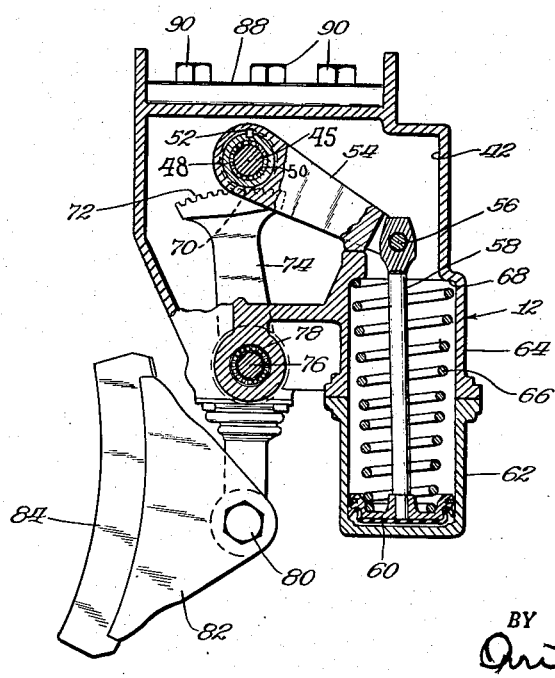
Figure 9 is a sectional view through the unit on the line 9—9 of Figure 3.

The outboard end portion of the housing 12 extends upwardly from the portion 26 and is formed with a vertical chamber 42 (Figures 3 and 9) closed by an outboard cover plate 44 secured thereto in any convenient manner as by studs (not shown). As best seen in Figures 3 and 9, the chamber 42 contains a shaft 45 keyed as at 46 to the housing 12. A rotatable sleeve 48 is mounted as by bearings 50 on the shaft 45 and is keyed as at 52 to a lever 54 operatively pivoted as at 56 (Figure 9) to a piston rod 58 of a piston 60 received within a cylinder segment 62 removably secured as by studs (not shown) to a cylinder 64 formed as an integral part of the housing 12 and communicating with the chamber 42. A release spring 66 is engaged with the piston 60 and a shoulder 68 at the upper end of the cylinder 64.

The sleeve 48 is geared as at 70 to a gear segment 72 on the upper, inner end of a lever 74 having trunnions 76 rotatably mounted as by bearings 78 in the plate 44 and the housing 12. The outer lower end of the lever 74 is pivoted as at 80 to a brake head 82 carrying a brake shoe 84 for braking engagement with the periphery of the adjacent wheel 86 of the assembly 6.

The top of the housing 12 above the chamber 42 is formed with a torque arm 88 connected as by bolts 90 to a bracket 94 on the frame 2, spacers 96 being interposed between the arm 88 and the bracket 94, whereby the vertical position of the shoes 38 and 84 may be adjusted by eliminating or adding one or more of the spacers 96 and 24.

The rear surface of the cylinder 64 of the housing 12 is formed with a thrust lug 98 bearing snugly against a thrust bracket 100 secured as by welding to the transom 22, said lug being in longitudinal alignment with the shoe 84 to transmit braking thrust or reaction of the lever 74 to the truck frame 2 thereby preventing excessive torque stresses in the connections at 16 and 90.

Figure 2:
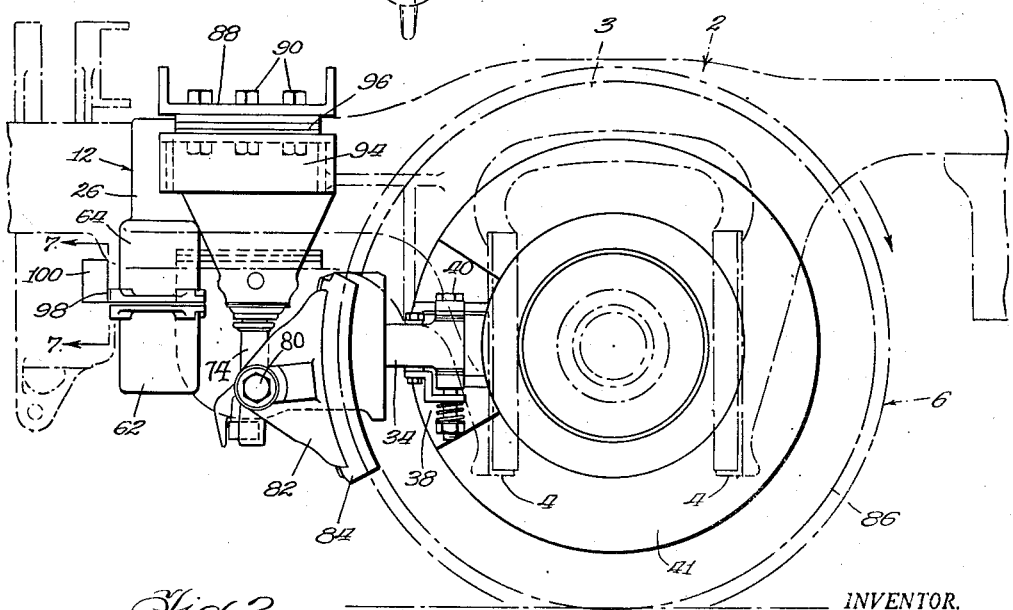
Figure 2 is a side elevational view of the structure shown in Figure 1.

It may be noted, with reference to Figure 2, that when the truck is moving toward the right as seen in that figure, the wheel is rotating in a clockwise direction as indicated by the arrow, whereby upon application of the shoes 38 to the disc 44, torque forces transmitted by the levers 34 to the housing 12 tend to rotate the latter in a counterclockwise direction relative to the torque connections at 16 and 90; however, inasmuch as the shoe 84 is normally engaged with the wheel 86 under the action of lever 74, under such conditions, the thrust of the lever 74 against the housing 12, due to reaction of the braking force exerted by the shoe 84, is effective to counteract the torque forces exerted by the levers 34 against the housing 12.

Furthermore, it may be noted that the thrust lug 98 and bracket 100 are effective to transmit braking thrust from the housing 12 to the frame 2 independently of the connections at 16 and 90, thereby minimizing stresses thereon under service conditions, whether the truck is moving to the right or the left as seen in Figure 2.

Tipping of the truck frame due to vertical force component of the off-wheel brake is restricted by clamping of the journal box (not shown) of the wheel and axle assembly 6 against the outer pedestal 4 as best seen in Figure 1, as the result of braking thrust by the shoe 84 against the wheel 86.

Figures 10 and 11 show a modification, wherein, as shown in Figure 10, rubber pads 102 are sleeved over the bolts 90 which are provided with bushings 104 fitted into an opening 106 of the arm 88. A plate 108 is seated against the top pad 102 to accommodate compression of the pads between the plate 108 and the bracket 94. Figure 11 shows a modified resilient connection between the torque lug 14 and the torque arm 18, wherein resilient pads 110 are compressed by the bolts 16 between the lug 14 and arm 18 and between the lug 14 and a plate 112.

It is contemplated that ordinarily, the levers 34 and the lever 54 will be simultaneously actuated as above described; however, it may be noted that either the lever 54 or the levers 34 may be actuated if desired.

Thus it will be understood that I have devised a novel compact and rugged brake mechanism in the form of a package unit which may be readily assembled and disassembled with respect to a railway car truck without disturbing the truck parts, and which is adapted to contain wheel brake means and off-wheel brake means and is adapted to minimize transmission of braking forces to the connections between the unit and the truck.

I claim:

1. In a brake arrangement for a railway car truck having a truck frame and a supporting wheel and axle assembly; the combination of a unit having an inboard chamber and an outboard substantially vertical chamber, a connection between the unit and frame above the vertical chamber, a connection between the unit and frame inboardly of the inboard chamber, a lever having a pivoted connection to the unit and having its lower end supporting a brake shoe for engagement with a peripheral wheel surface of said assembly, means in said vertical chamber for actuating the upper end of said lever, a pair of levers pivoted to the unit and projecting into the inboard chamber, means in the inboard chamber for actuating said pair of levers, means on said levers for decelerating other surfaces of said assembly, and thrust transmitting means on the unit and frame below the first-mentioned connection and in a vertical plane passing through said shoe and approximately parallel to the longitudinal center plane of the frame, said pivotal connection being approximately at the same distance below the first-mentioned connection as said thrust transmitting means, to substantially eliminate torque stresses on said first-mentioned connection.

2. In a brake arrangement for a railway car truck having a truck frame and a supporting wheel and axle assembly; the combination of a unit having an inboard chamber and an outboard substantially vertical chamber, a connection between the unit and frame above the vertical chamber, a connection between the unit and frame inboardly of the inboard chamber, a lever having a pivoted connection to the unit and having its lower end supporting a brake shoe for engagement with a peripheral wheel surface of said assembly, means in said vertical chamber for actuating the upper end of said lever, a pair of levers pivoted to the unit and projecting into the inboard chamber, means in the inboard chamber for actuating said pair of levers, and means on said levers for decelerating other surfaces of said assembly.

3. In a brake arrangement for a railway car truck having a frame with a side rail extending longitudinally of the truck and a transom extending transversely thereof and having a wheel and axle assembly; the combination of a torque arm connected to the transom and disposed approximately in the horizontal plane of the axle, a brake support unit removably connected at its inboard end to said arm, a torque arm extending upwardly from the outboard end of the unit and removably connected to the side rail, wheel brake means carried by the unit beneath said second-mentioned torque arm, and off-wheel brake means carried by the unit intermediate the first-mentioned torque arm and the wheel brake means.

4. In a brake arrangement for a railway car truck having a truck frame and a supporting wheel and axle assembly; the combination of a housing having torque connections at its inboard and outboard ends to the frame, said housing having a central portion with a pair of chambers, wheel brake means in one of the chambers for braking a wheel of said assembly, off-wheel brake means in the other chamber for braking the assembly inboardly of the wheel, and means on the housing and frame aligned longitudinally of the wheel brake means for transmitting reaction thereof to the frame independently of said torque connections.

5. In a brake arrangement for a railway car truck having a truck frame and a supporting wheel and axle assembly, the combination of a brake support unit, a pair of chambers in said unit, a torque connection between the unit and the frame at the inboard end of one chamber, a torque connection between the unit and the frame at the top of the other chamber substantially above the level of the first connection, off-wheel brake means extending from said one chamber for decelerating said assembly, wheel brake means extending from the other chamber for braking a peripheral surface of a wheel of said assembly, and thrust transmitting means on the frame and unit.

6. In a brake arrangement for a railway car truck having a truck frame and a supporting wheel and axle assembly; the combination of a package brake unit having outboard wheel brake means for frictionally engaging a peripheral wheel surface of said assembly and said unit having inboard off-wheel brake means for decelerating said assembly, said unit having support connections to said truck, and thrust transmitting means on the truck and unit in longitudinal alignment with the wheel brake means.

7. In a brake arrangement for a railway car truck having a truck frame and a supporting wheel and axle assembly; the combination of a housing having torque connections at its inboard and outboard ends to the frame, said housing having a central portion with a pair of chambers, wheel brake means extending from one of the chambers for braking a wheel of said assembly, and off-wheel brake means extending from the other chamber for braking the assembly inboardly of the wheel.

8. In a brake arrangement for a railway car truck having a truck frame and a supporting wheel and axle assembly; the combination of a unit removably carried by the truck, said unit having means for braking an off-wheel surface of the assembly, and said unit having other means for braking a peripheral surface of the assembly, said other means being so formed and arranged that its braking reaction counteracts that of said first-mentioned brake means under certain conditions.

9. In a brake arrangement for a railway car truck having a truck frame and a supporting wheel and axle assembly; the combination of a brake support unit detachably connected to the truck for assembly and disassembly as a unit with respect thereto, a lever pivoted to the unit on a substantially horizontal axis, brake means carried by the lever for engagement with the assembly, and thrust transmitting means on said unit in substantial alignment longitudinally of the truck with said brake means, said axis being disposed between the assembly and the thrust transmitting means.

10. In a brake arrangement for a railway car truck having a truck frame and a supporting wheel and axle assembly; the combination of a brake support unit, readily removable means connecting the unit to the truck, brake means carried by the unit and facing a wheel surface of the assembly for engagement therewith, and an opposed thrust surface on the unit facing away from said wheel and snugly engaged with a surface of said frame to transmit reaction of said brake means thereto, said unit and brake means being detachable from the truck without disassembling the brake means from the unit, upon removal of said readily removable means, said brake means being disposed between the wheel surface and thrust surface.

11. In a brake arrangement for a railway car truck having a wheel and axle; the combination of a unit having brake means for the periphery of the wheel and other brake means for a surface rotatable with the wheel, a plurality of connections between the truck and unit, and complementary flat thrust surfaces on the unit and truck in alignment longitudinally of the truck with the wheel and the first-mentioned brake means, and readily removable means for attaching the unit to the truck, said unit upon removal of said removable means being detachable from the truck together with said brake means, said first-mentioned brake means being disposed between said rotatable surface and the thrust surface of the unit.

12. In a brake arrangement for a railway car truck having a truck frame and a supporting wheel and axle assembly including a wheel; the combination of a unit removably carried by the truck, said unit comprising inboard and outboard brake shoes engageable with surfaces of said assembly inboardly of the wheel, and said unit having another brake shoe engageable with the periphery of the wheel, said other brake shoe being so arranged that during rotation of said wheel in one direction the thrust of said other shoe against said unit during a brake application is effective to counteract torque transmitted to said unit by said inboard and outboard shoes.

13. In a brake arrangement for a railway car truck having a truck frame and a supporting wheel and axle assembly including a wheel; the combination of a unit carried by the truck at one side of said assembly, said unit comprising a pair of substantially horizontal inboard and outboard brake levers, brake means operable by said levers and engageable with surfaces of said assembly inboardly of the wheel, said unit comprising a substantially vertical lever, brake means carried by said lever at the lower end thereof and engageable with the periphery of the wheel, and actuating means for simultaneously actuating all of said levers whereby the thrust of said vertical lever against said unit, during brake application when the wheel is rotating in one direction, is effective to counteract torque transmitted to said unit by said horizontal levers.

14. In a brake arrangement for a railway car truck having a supporting wheel and axle assembly; the combination of a housing having a central portion with a pair of chambers, wheel brake means extending from one of the chambers for braking a wheel of said assembly, off-wheel brake means extending from the other chamber for braking the assembly inboardly of the wheel, and means for transmitting torque from said housing to said truck at points disposed inboardly and outboardly of said portion.

CARL E. TACK.

REFERENCES CITED

The following references are of record in the file of this patent:

UNITED STATES PATENTS

| Number | Name | Date |
| --- | --- | --- |
| 2,295,244 | Tack | Sept. 8, 1942 |
| 2,406,048 | Tack | Aug. 20, 1946 |
| 2,418,435 | Tack | Apr. 1, 1947 |